United States Patent
Bearden et al.

(10) Patent No.: US 6,718,373 B1
(45) Date of Patent: Apr. 6, 2004

(54) METHOD AND SYSTEM FOR INSTALLING FILES IN A COMPUTING SYSTEM

(75) Inventors: Brian S. Bearden, Austin, TX (US); Don B. Johnson, Cedar Park, TX (US)

(73) Assignee: Dell USA L.P., Round Rock, TX (US)

( * ) Notice: Subject to any disclaimer, the term of this patent is extended or adjusted under 35 U.S.C. 154(b) by 0 days.

(21) Appl. No.: 09/452,114

(22) Filed: Nov. 30, 1999

(51) Int. Cl.[7] ............................................. G06F 15/177
(52) U.S. Cl. ...................... 709/220; 709/220; 709/221; 717/11; 710/23
(58) Field of Search ........................... 709/220, 221, 709/228; 717/11, 175, 174; 710/17

(56) References Cited

U.S. PATENT DOCUMENTS

| | | | |
|---|---|---|---|
| 6,131,192 A | * 10/2000 | Henry | 717/11 |
| 6,202,206 B1 | * 3/2001 | Dean et al. | 717/11 |
| 6,247,081 B1 | * 6/2001 | Murata | 710/104 |
| 6,247,128 B1 | * 6/2001 | Fisher et al. | 717/11 |
| 6,256,668 B1 | * 7/2001 | Slivka et al. | 717/11 |
| 6,353,928 B1 | * 3/2002 | Altberg et al. | 717/11 |
| 6,356,915 B1 | * 3/2002 | Chtchetkine | 707/200 |
| 6,378,128 B1 | * 4/2002 | Edelstein et al. | 717/174 |
| 6,389,589 B1 | * 5/2002 | Mishra et al. | 717/11 |

* cited by examiner

*Primary Examiner*—Rupal Dharia
*Assistant Examiner*—Adnan Mirza
(74) *Attorney, Agent, or Firm*—Michael A. Davis, Jr.; Haynes and Boone, LLP

(57) ABSTRACT

In a computing system, a computer-readable medium is for storing information. At least one computing device is for receiving at least one installation file and multiple installable files. The installation file includes at least one table for specifying an installation of a subset of the installable files. Also, the computing device is for identifying the subset in response to the table. Moreover, the computing device is for outputting the installation file and the identified subset of the installable files for storage by the computer-readable medium, such that less than all of the installable files are concurrently stored by the computer-readable medium.

28 Claims, 5 Drawing Sheets

Fig. 9

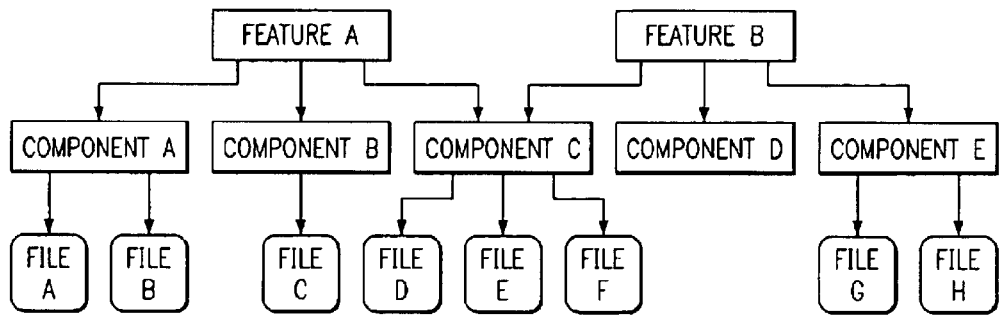

Fig. 10

| MSI Database | | | |
|---|---|---|---|
| Feature | | FeatureComponents | |
| *Feature* | | *Feature* | *Component* |
| ExcelHelpFiles | | ExcelHelpFiles | Global_DataAccess_ADO.UA |
| ExcelFiles | | ExcelHelpFiles | Global_DataAccess_DAO.UA |
| ASSISTANTGenius | | ExcelHelpFiles | Global_DataAccess_Jet.UA |
| Clip Thumbnails | | EXCELFiles | Global_Excel_ConvertersXL5 |
| | | EXCELFiles | Global_Excel_Core |
| | | EXCELFiles | Global_Excel_Intl |
| | | ASSISTANTGenius | Global_Assistant_Genius |
| Component | | File | |
| *Component* | | *File* | *Component* |
| Global_DataAccess_ADO.UA | | genius.acs | Global_Assistant_Genius |
| Global_DataAccess_DAO.UA | | ado210.chm | Global_DataAccess_ADO.UA |
| Global_DataAccess_Jet.UA | | adomdrd.txt | Global_DataAccess_ADO.UA |
| Global_Excel_ConvertersXL5 | | dao360.chm | Global_DataAccess_DAO.UA |
| Global_Excel_Core | | daoread.txt | Global_DataAccess_DAO.UA |
| Global_Excel_Intl | | Global_DataAccess_Jet.UA | jetdef40.chm |
| Global_Assistant_Genius | | xl5en32.olb | Global_Excell_ConvertersXL5 |
| | | xlcall32.dll | Global_Excel_Core |
| | | xlintl32.dll | Global_Excel_Intl |

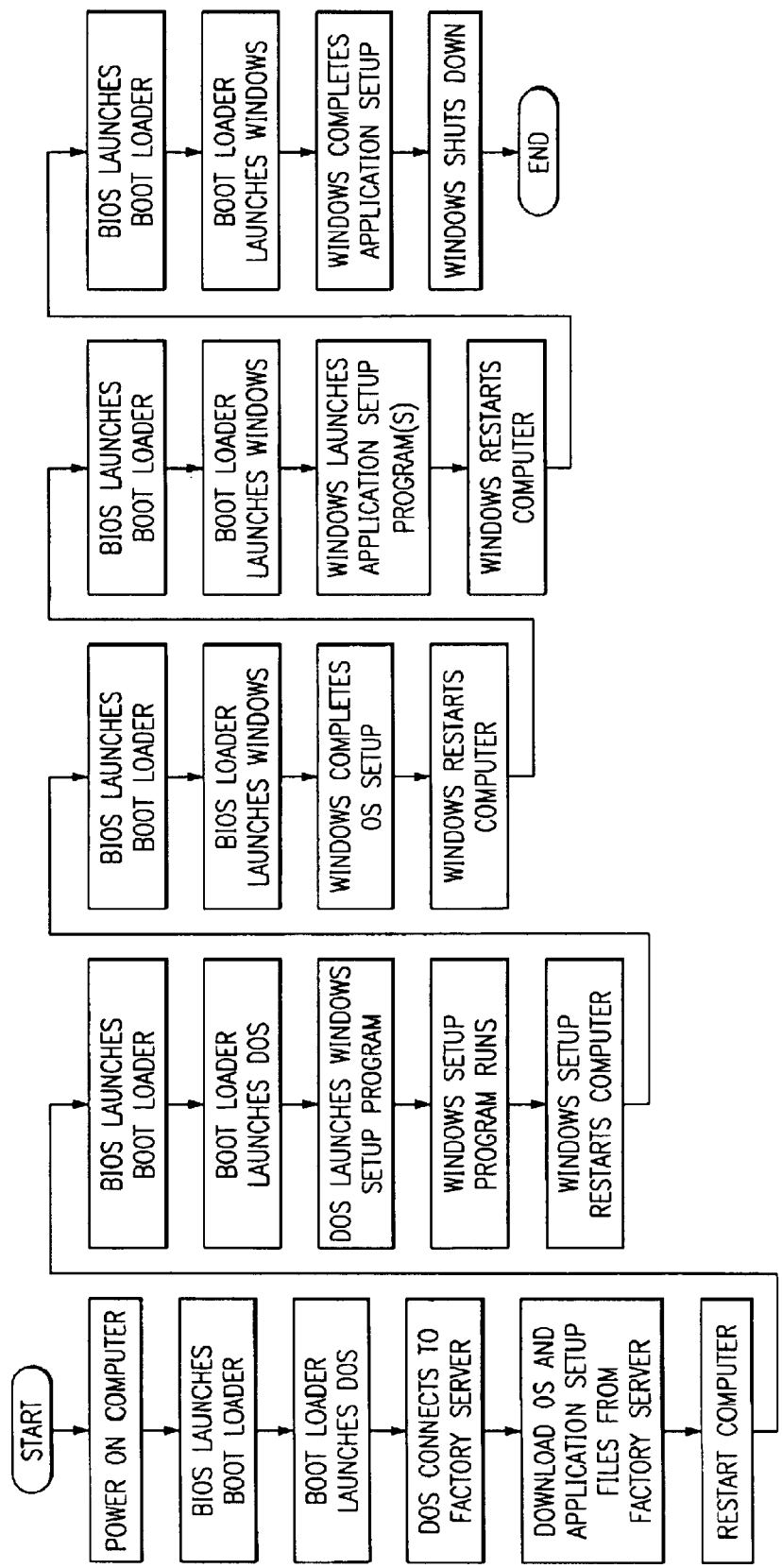

METHOD AND SYSTEM FOR INSTALLING FILES IN A COMPUTING SYSTEM

BACKGROUND

The disclosures herein relate in general to information processing systems and in particular to a method and system for installing files in a computing system.

With increased proliferation of computer software applications, and with increased complexity of such applications, files for installation of such applications in a computing system (e.g. on a hard disk of the computing system) are increasingly numerous and large. In some situations, it is possible that the computing system's hard drive or other computer-readable media may have insufficient capacity for concurrently storing such files during installation of their associated software applications.

Accordingly, a need has arisen for a method and system for installing files in a computing system, in which various shortcomings of previous techniques are overcome. More particularly, a need has arisen for a method and system for installing files in a computing system, in which the computing system's hard drive or other computer-readable media is more likely to have sufficient capacity for concurrently storing such files during installation of their associated software applications.

SUMMARY

One embodiment, accordingly, provides for a computer-readable medium for storing information in a computing system. At least one computing device is for receiving at least one installation file and multiple installable files. The installation file includes at least one table for specifying an installation of a subset of the installable files. Also, the computing device is for identifying the subset in response to the table. Moreover, the computing device is for outputting the installation file and the identified subset of the installable files for storage by the computer-readable medium, such that less than all of the installable files are concurrently stored by the computer-readable medium.

A principal advantage of this embodiment is that (a) various shortcomings of previous techniques are overcome, and (b) the computing system's hard drive or other computer-readable media is more likely to have sufficient capacity for concurrently storing such files during installation of their associated software applications.

BRIEF DESCRIPTION OF THE DRAWING

FIG. 9 is a second conceptual illustration of features, components and files of the illustrative embodiment.

FIG. 10 is a third conceptual illustration of features, components and files of the illustrative embodiment.

FIG. 13 is a flowchart of operation of the representative computing system of FIG. 2 in performing a "build-to-order" preparation of its hard disk.

DETAILED DESCRIPTION

Figure 1:
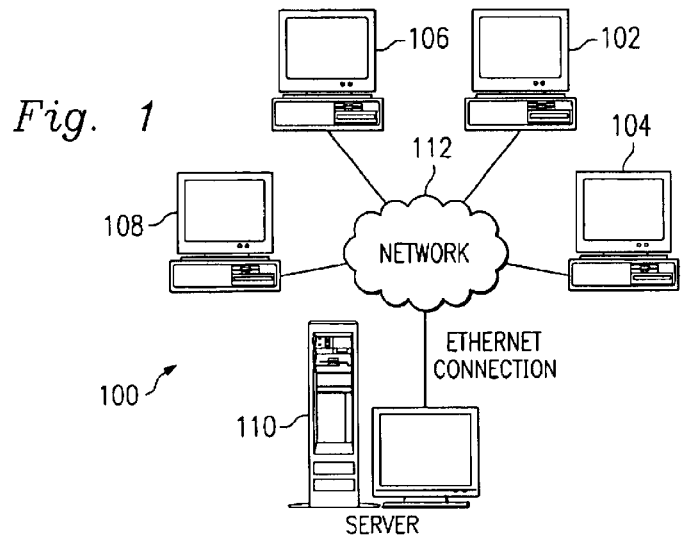
FIG. 1 is a block diagram of a system according to the illustrative embodiment.

FIG. 1 is a block diagram of a system, indicated generally at 100, according to the illustrative embodiment. System 100 includes (a) computing systems 102, 104, 106 and 108, and (b) a server 110 (which is also a computing system) for installing software onto computing systems 102, 104, 106 and 108 as part of a build-to-order process, as discussed further hereinbelow. Further, system 100 includes a conventional "ethernet" network 112.

Each of computing systems 102, 104, 106 and 108, and server 110 includes respective network interface circuitry for communicating with network 112 (i.e. outputting information to, and receiving information from, network 112), such as by transferring information (e.g. instructions, data, signals) between such computing system (or server) and network 112. As shown in FIG. 1, server 110 is coupled through network 112 to each of computing systems 102, 104, 106 and 108. Accordingly, through network 112, server 110 communicates with computing systems 102, 104, 106 and 108, and vice versa.

For clarity, FIG. 1 depicts four computing systems 102, 104, 106 and 108, although system 100 may include additional computing systems. For explanatory purposes, computing system 102 is a representative one of computing systems 102, 104, 106 and 108. Each of computing systems 102, 104, 106 and 108, and server 110 includes at least one respective computing device (e.g. computer) for executing a respective process and performing respective operations (e.g. processing and communicating information) in response thereto as discussed further hereinbelow. Each such computing system and computing device is formed by various electronic circuitry components.

In the illustrative embodiment, the computing devices of computing systems 102, 104, 106 and 108, are personal computers (e.g. IBM-compatible personal computers ("PCs")) that execute Microsoft Windows operating system ("OS") software. Also, in the illustrative embodiment, the computing device of server 110 is a server computer that executes Microsoft Windows NT OS software. Alternatively, any one or more of the computing devices of system 100 is any type of computer that executes any type of OS. All Microsoft products identified herein are available from Microsoft Corporation, One Microsoft Way, Redmond, Wash. 98052-6399, telephone (425) 882-8080.

Figure 2:
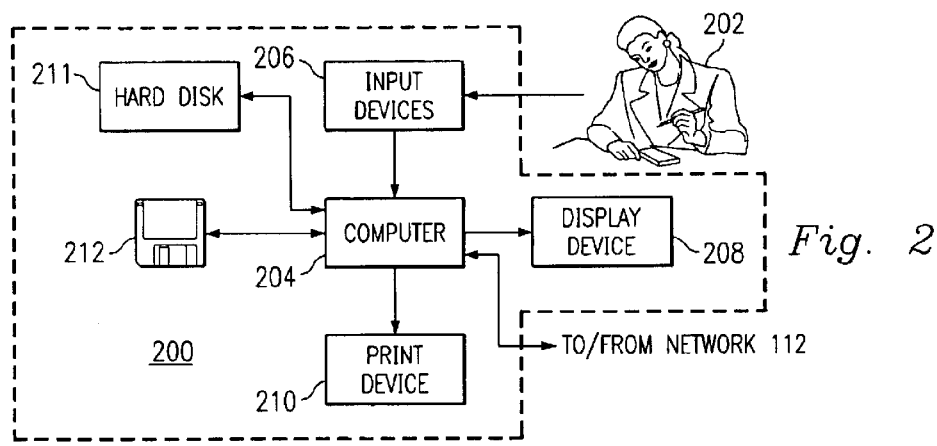
FIG. 2 is a block diagram of a representative one of the computing systems of the system of FIG. 1.

FIG. 2 is a block diagram of a representative one of the computing systems of system 100. Such representative computing system is indicated by dashed enclosure 200. Each of the computing systems of system 100 operates in association with a respective human user. Accordingly, in the example of FIG. 2, computing system 200 operates in association with a human user 202, as discussed further hereinbelow.

As shown in FIG. 2, computing system 200 includes (a) input devices 206 for receiving information from human user 202, (b) a display device 208 (e.g. a conventional electronic cathode ray tube ("CRT") device) for displaying information to user 202, (c) a computer 204 for executing and otherwise processing instructions, (d) a print device 210 (e.g. a conventional electronic printer or plotter), (e) a nonvolatile storage device 211 (e.g. a hard disk drive or other computer-readable medium (or apparatus), as discussed further hereinbelow) for storing information, (f) a computer-readable medium (or apparatus) 212 (e.g. a portable floppy diskette) for storing information, and (g) various other electronic circuitry for performing other operations of computing system 200.

For example, computer 204 includes network interface circuitry for communicating between computer 204 and network 112. As shown in FIG. 2, computer 204 is connected to network 112, input devices 206, display device 208, print device 210, storage device 211, and computer-readable medium 212.

For example, in response to signals from computer 204, display device 208 displays visual images, and user 202 views such visual images. Moreover, user 202 operates input devices 206 in order to output information to computer 204, and computer 204 receives such information from input devices 206. Also, in response to signals from computer 204, print device 210 prints visual images on paper, and user 202 views such visual images.

Input devices 206 include, for example, a conventional electronic keyboard and a pointing device such as a conventional electronic "mouse", rollerball or light pen. User 202 operates the keyboard to output alphanumeric text information to computer 204, and computer 204 receives such alphanumeric text information from the keyboard. User 202 operates the pointing device to output cursor-control information to computer 204, and computer 204 receives such cursor-control information from the pointing device.

Figure 3:
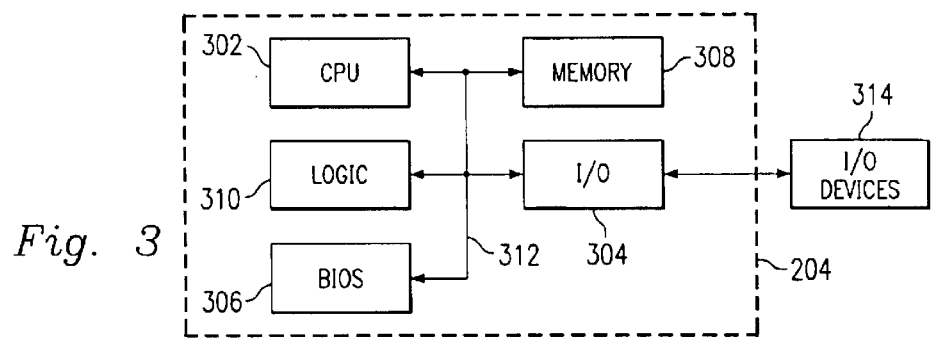
FIG. 3 is a block diagram of a computer of the computing system of FIG. 2.

FIG. 3 is a block diagram of computer 204, which is formed by various electronic circuitry components. Accordingly, as shown in FIG. 3, computer 204 includes a central processing unitt ("CPU") 302 for executing and otherwise processing instructions, input/output ("I/O") controller circuitry 304, a basic input output system ("BIOS") electrically erasable programmable read only memory device ("EEPROM") 306 for storing information (e.g. firmware instructions), a memory 308 such as random access memory device ("RAM") and read only memory device ("ROM") for storing information (e.g. instructions executed by CPU 302 and data operated upon by CPU 302 in response to such instructions), and other miscellaneous electronic circuitry logic 310 for performing other operations of computer 204, all coupled to one another through one or more buses 312. Also, computer 204 may include various other components that, for clarity, are not shown in FIG. 3.

As shown in FIG. 3, I/O controller circuitry 304 is coupled to I/O devices 314. I/O devices 314 include, for example, input devices 206, display device 208, print device 210, floppy diskette 212, hard disk 211, and network 112. Accordingly, I/O controller circuitry 304 includes the network interface circuitry (as discussed hereinabove in connection with FIGS. 1 and 2) and other controller circuitry for operating I/O devices 314, reading information from I/O devices 314, and writing information to I/0 devices 314.

Computer 204 operates its various components (e.g. I/O controller circuitry 304) in response to information stored by BIOS 306. For example, I/O controller circuitry 304 outputs various interrupt requests ("IRQs"), and computer 204 reacts to such IRQs in response to information stored by BIOS 306. Accordingly, by suitably modifying information stored by BIOS 306, one or more components of computer 204 may be effectively disabled, so that computer 204 operates without reference to such components. In such a situation where a component is disabled, computer 204 would not react to an IRQ from such a disabled component, and computer 204 would not allocate resources to such a disabled component.

Figure 4:
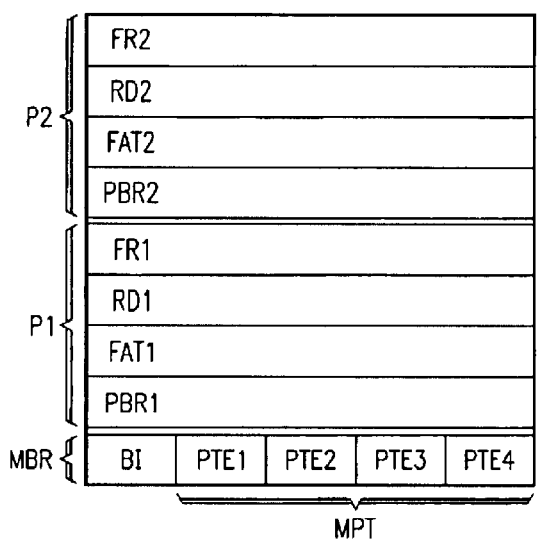
FIG. 4 is a conceptual illustration of information stored by a hard disk of the computing system of FIG. 2.

FIG. 4 is a conceptual illustration of information, indicated generally at 400, stored by hard disk 211. I/O controller circuitry 304 outputs signals to hard disk 211, and hard disk 211 receives, stores and/or outputs such information in response to such signals. Such information includes a master boot record MBR, as shown in FIG. 4.

In accordance with the IBM-compatible PC architecture, the MBR is the first sector (cylinder 0, head 0, sector 1) on hard disk 211. A sector is the smallest individually addressable unit of storage on a hard disk. Under the IBM-compatible PC architecture, hard disks have a sector size of 512 bytes. Accordingly, in the illustrative embodiment, to the extent that computer 204 forms (e.g. creates or modifies) a partition Px on hard disk 211, computer 204 defines such partition along cylinder boundaries. A cylinder is a unit of organization on a hard disk that is equal to the number of read/write heads multiplied by the number of sectors per track multiplied by the number of bytes per sector.

The MBR includes bootstrap instructions BI and a master partition table MPT for managing disk storage. In accordance with the IBM-compatible PC architecture, the MPT includes four partition table entries, namely PTE1, PTE2, PTE3 and PTE4. A partition table entry PTEx (where x=1, 2, 3 or 4) includes information that describes the size, location, and type (extended, new technology file system ("NTFS"), 16-bit or 32-bit file allocation table ("FAT"), primary or utility) of a partition Px associated with such PTEx.

Each partition table entry PTEx includes a respective "active" flag. I/O controller circuitry 304 outputs signals to hard disk 211, so that a maximum of only one of the four partition table entries PTEx is marked as "active" at any particular moment (i.e. only a maximum of one of the four "active" flags is set to a logic 1 true state at any particular moment). For example, BI includes instructions for determining whether (and which) one of the partition table entries PTEx is marked as "active."

In the example of FIG. 4, hard disk 211 includes partitions P1 and P2. Partition P1 includes a partition boot record PBR1, a file allocation table FAT1, a root directory RD1, and a file region FR1. Likewise, partition P2 includes a partition boot record PBR2, a file allocation table FAT2, a root directory RD2, and a file region FR2.

With the operating system software, computer 204 designates (e.g. maps, or refers to) a partition by an associated logical drive letter (e.g. C: or A:) that identifies a respective logical drive associated with the partition. With such designation, the partition likewise is associated with the respective logical drive. However, without such designation, it is possible for a partition to be unassociated with any logical drive.

A computer, such as computer 204, is "booted" (or "rebooted") when it initiates execution of operating system software (e.g. Microsoft Windows) in response to an event ("boot event"). Such a boot event may be, for example, user 202 "turning on" computer 204 (e.g. user 202 causing application of electrical power to computer 204 by switching an on/off button of computer 204). Alternatively, such a boot event may be receipt by computer 204 of a command to initially execute the operating system software. For example, computer 204 may receive such a command from user 202 (e.g. through input devices 206), or from a computer application executed by computer 204, or from another computer (e.g. from server 110 through network 112).

Notably, in response to booting (or rebooting) computer 204:

(a) computer 204 reads instructions into memory 308: (i) from BI; and (ii) from PBRx if partition table entry PTEx is marked as "active;" and (b) executes such instructions in response to information stored by BIOS 306.

PBRx is the partition boot record of Px, which is the partition associated with PTEx. In the illustrative embodiment, a PBRx is a single sector of information. BI and each PBRx include instructions according to the operating system software's type, version, and language.

In response to signals from computer 204, an FRx stores information files. Each FRx is divided into a number C of information clusters. A particular cluster is designated as cluster b, where b is an integer number between 0 and C-1. Likewise, each file allocation table FATx includes C entries, each associated with a respective one of the clusters within FRx. For example, if C=65,536, then FATx includes 65,536 entries numbered b=0 through 65,535.

In the illustrative embodiment, the clusters within a particular FRx are equally sized, so that each cluster has a size=$2^y$, where y is an integer number and $C*2^y$ is less than or equal to the size of the particular FRx. Accordingly, PBRx includes a BIOS parameter block that specifies y and C for the particular FRx. Each FRx has its own respective size, and each partition has its own respective values of y and C.

In the illustrative embodiment, each root directory RDx includes space for storing up to 512 entries per RDx. Such an entry is associated with an information file and includes the file's filename (e.g. PROGRAM.EXE, DATA.DAT, COMMANDS.BAT), date, time, size, attributes (e.g. hidden), and starting cluster. The starting cluster is one of the C clusters within FRx.

For accessing (e.g. writing information into or reading information from) a partition Px, CPU 302 of computer 204 outputs a command to I/O controller circuitry 304 of computer 204, and I/O controller circuitry 304 receives such command. Such command is addressed to a partition Px (and, accordingly, to a respective logical drive associated with partition Px) by specifying an associated logical drive letter (e.g. C: or A:) that designates partition Px (and, accordingly, that identifies a respective logical drive associated with partition Px). Such command also specifies a particular information file by its filename.

I/O controller circuitry 304 (a) allocates or de-allocates one or more clusters if (and to the extent) appropriate for storing an entire information file and (b) suitably modifies entries within FATx to accurately indicate an order for accessing such clusters in connection with reading and writing the file (e.g. if the file is stored across multiple clusters of hard disk 211). In the illustrative embodiment, if entry b within FATx is a 16-bit entry (identifying a next cluster q within FRx), the largest logical drive (and likewise the largest partition) managed by computer 204 is (a) two gigabytes for the Microsoft DOS operating system software, (b) two gigabytes for the Microsoft Windows 95 operating system software, and (c) four gigabytes for the Microsoft Windows NT operating system software. In the illustrative embodiment, a gigabyte is $1024^3$ bytes.

Notably, a new hard disk normally is blank and does not contain partitioning information. As part of a high volume computer assembly or manufacturing operation, blank hard disks are installed in a large number of computing systems, such as computing systems 102, 104, 106 and 108. In that situation, computing systems 102, 104, 106 and 108 prepare their respective hard disks in response to various information (e.g. instructions, data). Much of such information is received by computing systems 102, 104, 106 and 108 from server 110 through network 112.

For example, if hard disk 211 is blank and is installed in representative computing system 200, and computer 204 is booted (e.g. in response to instructions stored on floppy diskette 212), then computer 204 recognizes the lack of partitions on hard disk 211. In that situation, computer 204 initializes (e.g. prepares) hard disk 211 by formatting it and suitably adding, modifying or deleting one or more partitions on it. In the illustrative embodiment, such initialization is part of a process executed by computer 204 to install files and information structures on hard disk 211 for supporting various devices of computing system 200.

Computer 204 performs such a process, at least in part, in response to information received by computer 204 from server 110 through network 112. Accordingly, in response to such information from server 110, computer 204 (a) initializes (e.g. writes information to) hard disk 211, (b) initializes the information structures of hard disk 211 for identifying logical drives, and (c) performs other actions, such as installing software files, for preparing hard disk 211.

Figure 5:
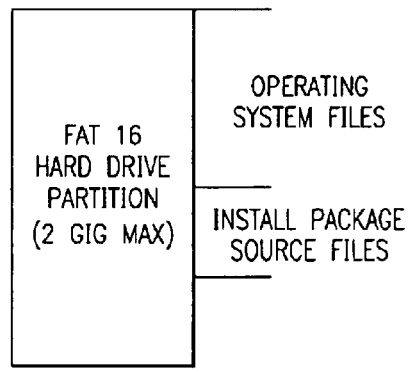
FIG. 5 is a first conceptual illustration of a partition of FIG. 4.
Figure 6:
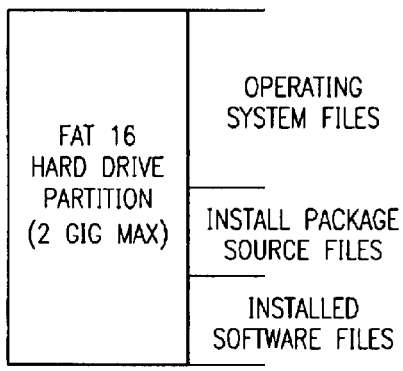
FIG. 6 is a second conceptual illustration of the partition of FIG. 4.
Figure 7:
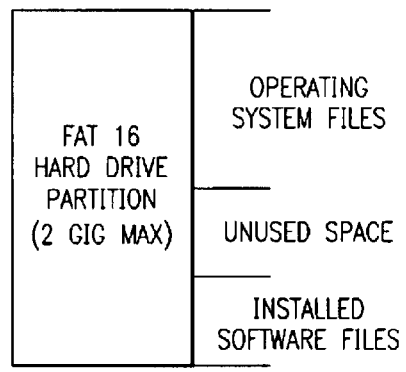
FIG. 7 is a third conceptual illustration of the partition of FIG. 4.

FIGS. 5, 6 and 7 are conceptual illustrations of a "FAT 16" partition on hard disk 211. As a "FAT 16" partition, each entry b within the partition's associated FATx is a 16-bit entry that identifies a next cluster q within the partition's associated FRx. In that situation, as mentioned hereinabove in connection with FIG. 4, the largest logical drive (and likewise the largest partition) managed by computer 204 is (a) two gigabytes for the Microsoft DOS operating system software, (b) two gigabytes for the Microsoft Windows 95 operating system software, and (c) four gigabytes for the Microsoft Windows NT operating system software.

Referring to FIG. 5, a significant amount of the partition's associated FRx is dedicated to storing operating system ("OS") files, such as files of Microsoft Windows 95 OS, which computer 204 copies and installs onto the partition from server 110 through network 112. Also, for efficiency as part of a high volume computer assembly or manufacturing operation, in order to install particular software files onto the partition, the partition stores an image (or "copy") of commercially available (a) install package source files and (b) .MSI files (i.e. Microsoft Windows Installer installation files).

Computer 204 copies the install package source files and .MSI files onto the partition from server 110 through network 112. In that manner, computer 204 advantageously reduces its amount of communication with server 110 (through network 112), as contrasted with a situation in which computer 204 copies such files from server 110 (through network 112) in a more incremental fashion. Accordingly, in that manner, server 110 advantageously achieves a higher level of availability to communicate with other computing devices of system 100.

Moreover, by storing the install package source files and .MSI files on hard disk 211, computer 204 advantageously is able to perform installation of software files in a manner that is substantially independent of further reference to a separate (i.e. different from hard disk 211) computer-readable medium (e.g. Compact Disc Read Only Memory ("CD- ROM")). Such a technique is particularly advantageous as part of a high volume computer assembly or manufacturing operation, because establishment of a temporary connection between computer 204 and such a separate computer-readable medium (e.g. CD-ROM) is inefficient. Moreover, such a temporary connection may require human intervention (e.g. insertion of a CD-ROM) into a device of computing system 200.

For purposes of illustration in FIGS. 5 and 6, the .MSI files are stored among the install package source files. Each .MSI file is associated with a respective software application (e.g. "Office2000.MSI" file associated with Microsoft Office 2000 software, "Norton AV.MSI" file associated with Norton AntiVirus software, "Acrobat.MSI" file associated with Adobe Acrobat software). Moreover, each .MSI file includes a respective set of tables, which are stored in a relational database format, for specifying the manner in which computer 204 is to install the .MSI file's respectively associated software application onto a target partition of hard disk 211. Accordingly, in response to (and in accordance with) the .MSI file, computer 204 installs the .MSI file's respectively associated software application onto the target partition.

Examples of the .MSI file's tables include:
(a) Install Sequence Table for specifying a selection and order of installation operations to be executed by computer 204 for installing the .MSI file's respectively associated software application onto the partition, including the operations of (i) verifying whether the partition has adequate space remaining to store particular software files that are specified by the .MSI file (e.g. by the .MSI file's Feature Table, Component Table, Directory Table, File Table) for installation onto the partition, and (ii) executing custom actions that are specified by the .MSI file's Custom Action Table;
(b) Custom Action Table for specifying custom actions (e.g. .DLL files) to be executed by computer 204 for installing the .MSI file's respectively associated software application onto the partition; and
(c) other tables, such as:
  (i) Properties Table for specifying general information, such as version number, product identification code, and company name;
  (ii) Media Table for specifying types of media (e.g. CD-ROM, network, hard disk) from which files are to be copied by computer 204 for installing the .MSI file's respectively associated software application onto the partition;
  (iii) Feature Table;
  (iv) Component Table;
  (v) Feature/Component Table;
  (vi) File Table;
  (vii) Directory Table;
  (viii) Conditional Table;
  (ix) Registry Table;
  (x) INItialization File Table;
  (xi) Font Table; and
  (xii) Services Table.

Advantageously, many commercially available software applications include vendor-supplied installation packages (e.g. install package source files and .MSI files), that are designed for use with commercially available Microsoft Windows Installer software. However, a shortcoming is that such installation packages are sometimes very large. This shortcoming is noteworthy because, as mentioned hereinabove, the largest "FAT 16" partition is two gigabytes for the Microsoft Windows 95 operating system software.

Referring also to FIG. 6, computer 204 executes Microsoft Windows Installer software for installing (or "copying") particular software files onto the partition in response to (a) instructions of the Microsoft Windows Installer software and (b) information of the .MSI files (e.g. as specified by the .MSI file's Feature Table, Component Table, Directory Table, File Table). During such installation, computer 204 copies those specified particular software files from the install package source files. Accordingly, the install package source files are installable files that are installable onto a partition of hard disk 211.

Referring to FIG. 7, after computer 204 installs the specified particular software files ("installed software files" in FIGS. 6 and 7) onto the partition, computer 204 deallocates the space (on the partition) that was occupied by the install package source files, so that such space is reallocatable to store other files. Nevertheless, with reference again to FIGS. 5 and 6, while computer 204 installs the specified particular software files onto the partition, such space remains allocated to store the install package source files.

Accordingly, in view of the partition's two gigabyte size limitation, and in view of the large size of many commercially available installation packages, it would be advantageous to reduce the size of install package source files that are stored on the partition. As mentioned hereinabove, particular software files are specified by the .MSI file for installation onto the partition. As shown in FIGS. 5 and 6, by reducing the size of install package source files that are stored on the partition, computer 204 enhances the partition's likelihood of having adequate space remaining to store the specified particular software files ("installed software files" in FIGS. 6 and 7) during their installation onto the partition.

FIGS. 8, 9, 10 and 11 are conceptual illustrations of features, components and files. Such features, components and files are stored within the install package source files of FIGS. 5 and 6. A feature is a logical component of a particular software application (e.g. Microsoft Office 2000). For example, it has been estimated that Microsoft Office 2000 software has approximately 1500–2000 features. Each feature has zero or more associated components, and each component has zero or more associated files, as for example specified in Feature Tables, Component Tables, Feature/Component Tables, and File Tables of the .MSI files.

Figure 8:
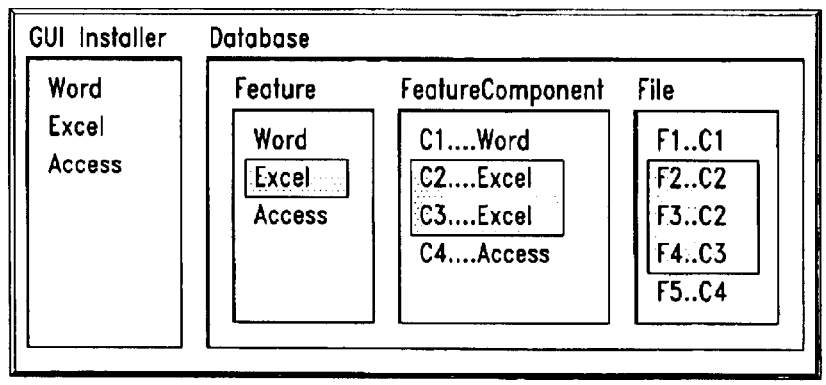
FIG. 8 is a first conceptual illustration of features, components and files of the illustrative embodiment.

In the example of FIG. 8, (a) the "Excel" feature has associated components C2 and C3, (b) component C2 has associated files F2 and F3, and (c) component C3 has an associated file F4.

As illustrated in FIG. 9, features, components and files are interrelated to one another in a hierarchy (e.g. hierarchical tree structure, arrangement, organization or classification). In the example of FIG. 9, a Feature A has associated Components A, B, and C. Also, a Feature B has associated Components C, D, and E. Notably, each of the Features A and B is associated with Component C, which is a shared (or "common") component of such multiple features. Feature A may be, for example, a spell check feature of Microsoft Office 2000 software. Feature B may be, for example, a Japanese language support feature of Microsoft Office 2000 software.

The components have respectively associated files, as for example shown in FIG. 9. As shown in FIG. 9, (a) Component A has associated Files A and B, (b) Component B has an associated File C, (c) Component C has associated Files D, E, and F, and (d) Component E has associated Files G and H.

Figure 11:
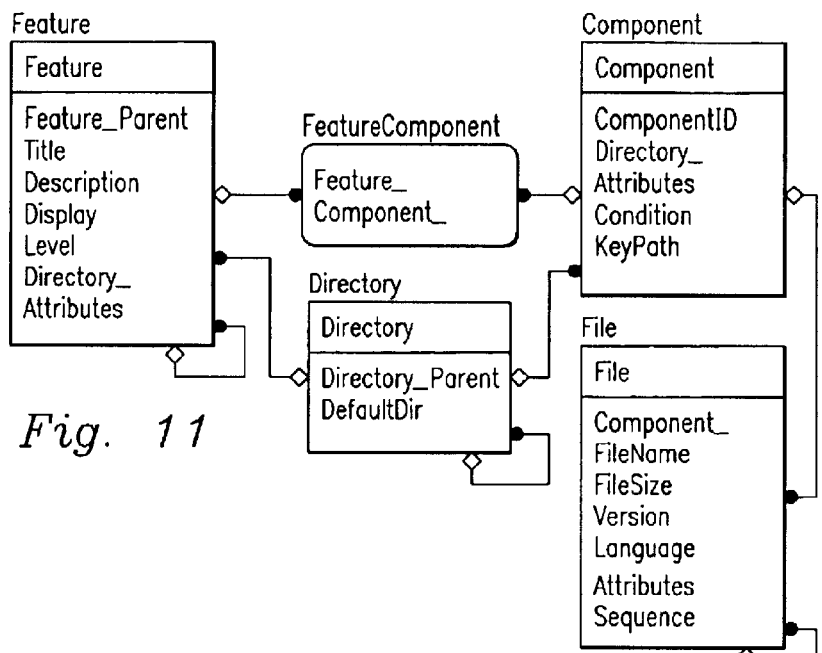
FIG. 11 is a fourth conceptual illustration of features, components and files of the illustrative embodiment.

Such interrelationships between features, components and files are further illustrated in the examples of FIGS. 10 and 11. Notably, in FIG. 11, a directory additionally specifies a physical location (e.g. address within a computer-readable medium) of such files.

In a significant aspect of the illustrative embodiment, if a particular feature is not specified for use in representative computing system 200 (and, accordingly, is not specified for installation onto hard disk 211), then computing system 200 omits the associated files of such particular feature from the concurrently stored (i.e. stored concurrently with one another) install package source files of FIGS. 5 and 6, so that less than all of the vendor-supplied commercially available install package source files are concurrently stored on the partition of hard disk 211. In that manner, computing system 200 (a) reduces the size of install package source files that are stored on the partition and (b) accordingly, enhances the partition's likelihood of having adequate space remaining to store the specified particular software files ("installed software files" in FIGS. 6 and 7) during their installation onto the partition. Those specified particular software files are associated with particular features that are specified for use in computing system 200, as for example specified by the .MSI files received by computing system 200 from server 110 through network 112. For example, with reference to FIG. 9, if Feature A is specified for use in computing system 200, yet Feature B is not specified for use in computing system 200, then computing system 200 (a) concurrently stores Files A, B, C, D, E and F as part of the stored install package source files of FIGS. 5 and 6, and (b) omits Files G and H from the stored install package source files of FIGS. 5 and 6.

Accordingly, in response to information (e.g. .MSI files) from server 110, each of computing systems 102, 104, 106 and 108, independently of one another, selectively omits files (such omitted files being associated with particular features that are not specified for use in such computing system). In that manner, in response to information from server 110, computing systems 102, 104, 106 and 108 can be "built-to-order" differently from one another, each selectively omitting different files from its respective partition's concurrently stored install package source files, so that less than all of the vendor-supplied commercially available install package source files are concurrently stored on its respective partition.

On a particular computing system-by-computing system basis, in the illustrative embodiment, such omission of files is achieved by server 110 selectively (a) transmitting (or "outputting") only a subset of the install package source files (the subset being associated with particular features that are specified for use in such computing system) to the particular computing system through network 112 and (b) omitting such transmission of other install package source files (such other files being associated with particular features that are not specified for use in such computing system). In that manner, the speed of transmitting the install package source files (from server 110 to such computing system through network 112) is increased.

In the illustrative embodiment, server 110 stores a larger set of install package source files on its hard disk (which, in the illustrative embodiment, has a partition significantly larger than the partition of hard disk 211), and server 110 selects the subsets of transmitted and omitted files from among such larger set.

In an alternative embodiment, server 110 (a) receives the install package source files (and the .MSI files) from a computer-readable medium (e.g. network 112 or CD-ROM or hard disk), (b) identifies (or "selects") a subset of such install package source files in response to at least one of the .MSI files, as discussed further hereinbelow, and (c) stores only the identified subset on a hard disk (or other computer-readable medium) of server 110. In one version of such an alternative embodiment, server 110 transmits the entire subset to each of computing systems 102, 104, 106 and 108 through network 112. In such an alternative embodiment, the subset of install package source files (a) is associated with particular features that are specified for use in one or more of computing systems 102, 104, 106 and 108, and (b) omits other install package source files (such other files being associated with particular features that are not specified for use in any of such computing systems). In one example, with install package source files of Microsoft Office 2000 software, it was estimated that such an alternative embodiment reduced ~800 megabytes of such files to ~450 megabytes.

In yet another alternative embodiment, selective omission of files is achieved by a particular computing system (e.g. 102 or 200) receiving at least one .MSI file from server 110 through network 112. In such an alternative embodiment, in response to the .MSI file, the computing system selectively omits install package source files from concurrent storage (i.e. storage concurrently with one another) on such computing system's respective hard disk partition after such computing system receives all such files from server 110 through network 112 (such omitted files being associated with particular features that are not specified for use in such computing system). In that manner, less than all such files (e.g. less than all of the vendor-supplied commercially available install package source files which are received by such computing system from server 110 through network 112) are concurrently stored on such computing system's respective hard disk partition.

Figure 12:
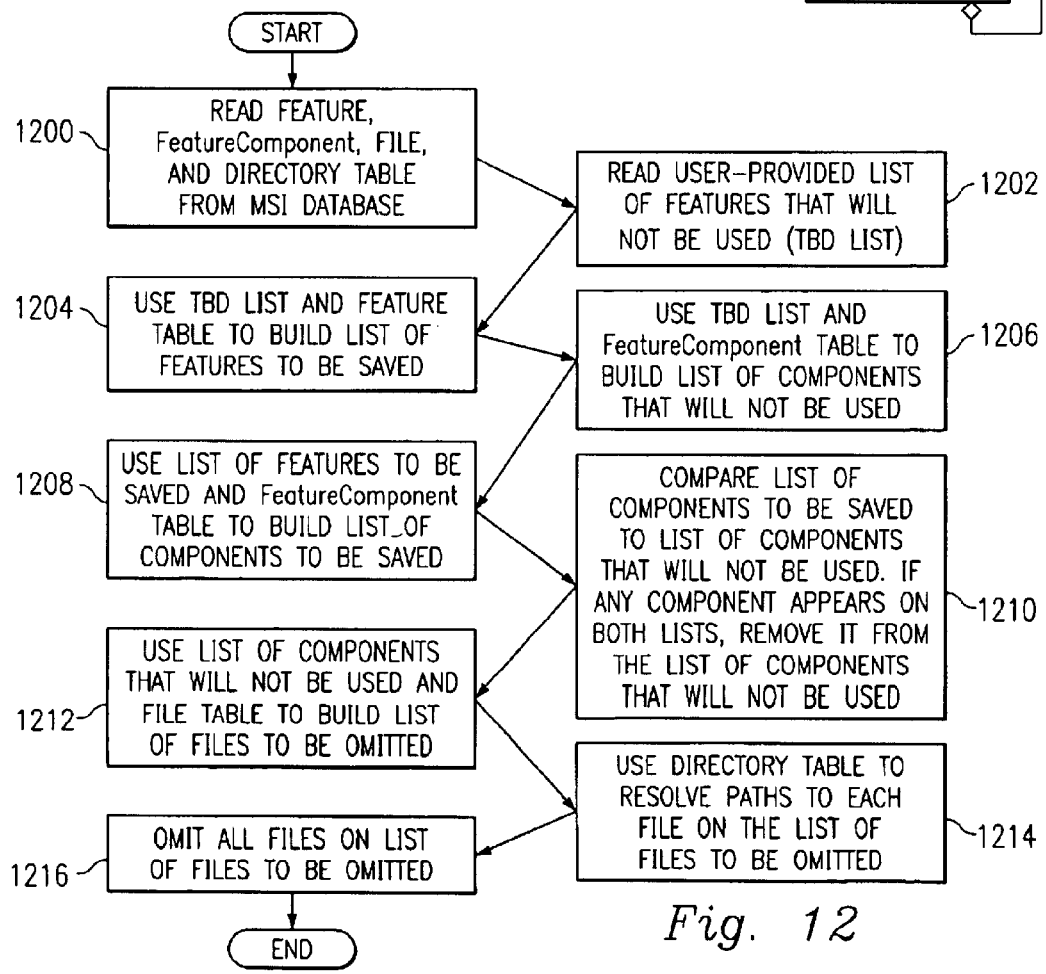
FIG. 12 is a flowchart of operation of a server of FIG. 1 in performing a selective omission of install package source files of the illustrative embodiment.

FIG. 12 is a flowchart of operation of server 110 in performing the selective omission of install package source files (such omitted files being associated with particular features that are not specified for use in such computing system). The operation begins at a step 1200 where server 110 reads Feature, Feature/Component, File and Directory Tables from an .MSI file. In this example, the .MSI file is associated with a respective software application that is specified for use in one or more of computing systems 102, 104, 106 and 108.

After step 1200, server 110:

(a) at a step 1202, reads (e.g. from a hard disk of server 110) a user-specified list of features that are not specified for use in a particular computing system (such list being referred to herein as a "TBD List");

(b) at a step 1204, in response to the TBD List (of features from step 1202) and the Feature Table, identifies (or "selects") a list of features that are specified for use in the particular computing system;

(c) at a step 1206, in response to the TBD List (of features from step 1202) and the Feature/Component Table, identifies a list of components that are not specified for use in the particular computing system;

(d) at a step 1208, in response to the list of features from step 1204 and the Feature/Component Table, identifies a list of components that are specified for use in the particular computing system;

(e) at a step 1210, (i) compares the list of components from step 1206 with the list of components from step 1208, and (ii) if any component is present in both of such lists, removes such component from the list of components from step 1206;

(f) at a step 1212, in response to the list of components from step 1206 (as modified by step 1210) and the File Table, identify a list of files to be omitted from transmission to the particular computing system through network 112;

(g) at a step 1214, in response to the list of files from step 1212 and the Directory Table, identify locations (e.g. on a hard disk of server 110) of the files from step 1212; and (h) at a step 1216, store the list of file locations from step 1214 for reference by server 110 during its transmission of install package source files to the particular computing system through network 112, so that server 110 omits the listed files from such transmission.

In an alternative embodiment, which may be preferable in some situations, the operation of server 110 is streamlined after step 1200, such that server 110 (in place of steps 1202 through 1216):

(a) identifies (or "selects") a list of features that are specified for use in a particular computing system;

(b) in response to the list of features from step (a) and the Feature/Component Table, identifies a list of components that are specified for use in the particular computing system;

(c) in response to the list of components from step (b) and the File Table, identifies a list of files to be transmitted to the particular computing system through network 112;

(d) in response to the list of files from step (c) and the Directory Table, identifies locations (e.g. on a hard disk of server 110) of the files from step (c); and (e) stores the list of file locations from step (d) for reference by server 110 during its transmission of install package source files to the particular computing system through network 112, so that server 110 omits any unlisted files from such transmission.

In performing step (a), in response to programming of suitable instructions, server 110 is able to identify the list of features (that are specified for use in a particular computing system) for a particular software application by:

(i) performing a sample installation of the particular software application, and identifying such list of features in response to a resulting log file, which server 110 creates in response to executing the Microsoft Windows Installer software during (and as part of) the sample installation; or (ii) performing a sample installation of the particular software application, and identifying such list of features in response to querying the Microsoft Windows Installer software during (and as part of) the sample installation, such querying being performed by server 110 executing a group of instructions that calls a Microsoft Windows Installer application program interface ("API") of the Microsoft Windows Installer software; or (iii) reading values (e.g. default states) in the Feature Table of the particular software application's associated .MSI file, and identifying such list of features in response thereto.

In performing step (a), in response to programming of suitable instructions, server 110 is able to revise the identified list of features (e.g. by deleting and/or adding one or more identified features) in response to information in the Conditional Table of the particular software application's associated .MSI file, so that the identified list of features is consistent with such information in the Conditional Table.

FIG. 13 is a flowchart of operation of representative computing system 200 in performing a "build-to-order" preparation of its hard disk 211. In FIG. 13, all of the stated operations are performed by computer 204 in response to instructions from various software referenced in FIG. 13. For example, in stating that "BIOS launches Boot Loader," the meaning is that "computer 204 launches Boot Loader in response to instructions of BIOS." In reviewing FIG. 13, the following list of meanings (specific to FIG. 13) is helpful.

| | |
|---|---|
| "computer" | computer 204 |
| "BIOS" | BIOS 306 |
| "launches" | initiates execution of |
| "Boot Loader" | bootstrap instructions BI (FIG. 4) |
| "DOS" | Microsoft DOS operating system software |
| "connects to" | communicates with |
| "Factory Server" | server 110 |
| "OS" | DOS and Microsoft Windows 95 operating system software |
| "Application Setup Files" | the install package source files, .MSI files, Microsoft Windows Installer software & files (e.g. .DLL files) that specify other actions (e.g. custom actions) as identified in .MSI files |
| "Restart" | reboot |
| "Windows" | Microsoft Windows 95 operating system software |
| "Runs" | is executed by computer 204 |
| "Application Setup Program(s)" | Microsoft Windows Installer software & files (e.g. .DLL files) that specify other actions (e.g. custom actions) as identified in .MSI files |
| "Application Setup" | execution of Application Setup Program(s) |

In the process of computer 204 initiating execution of DOS in response to instructions of Boot Loader (bootstrap instructions BI), if DOS is initially absent from hard disk 211, then computer 204 reads DOS from floppy diskette 212.

Referring again to FIG. 2, computer-readable medium 212 is a floppy diskette. Computer-readable medium 212 and computer 204 are structurally and functionally interrelated with one another as described further hereinbelow. Each computing device of the illustrative embodiment is structurally and functionally interrelated with a respective computer-readable medium, similar to the manner in which computer 204 is structurally and functionally interrelated with computer-readable medium 212. In that regard, computer-readable medium 212 is a representative one of such computer-readable media, including for example but not limited to storage device 211.

Computer-readable medium 212 stores (or encodes, or records, or embodies) functional descriptive material (e.g. including but not limited to software (also referred to as computer programs or applications) and data structures). Such functional descriptive material imparts functionality when encoded on computer-readable medium 212. Also, such functional descriptive material is structurally and functionally interrelated to computer-readable medium 212.

Within such functional descriptive material, data structures define structural and functional interrelationships between such data structures and computer-readable medium 212 (and other aspects of computer 204, computing system 200 and system 100). Such interrelationships permit the data structures' functionality to be realized. Also, within such functional descriptive material, computer programs define structural and functional interrelationships between such computer programs and computer-readable medium 212 (and other aspects of computer 204, computing system 200 and system 100). Such interrelationships permit the computer programs' functionality to be realized.

For example, computer 204 reads (or accesses, or copies) such functional descriptive material from computer-readable medium 212 into the memory device of computer 204, and computer 204 performs its operations (as described elsewhere herein) in response to such material which is stored in the memory device of computer 204. More particularly, computer 204 performs the operation of processing a computer application (that is stored, encoded, recorded or embodied on a computer-readable medium) for causing computer 204 to perform additional operations (as described elsewhere herein). Accordingly, such functional descriptive material exhibits a functional interrelationship with the way in which computer 204 executes its processes and performs its operations.

Further, the computer-readable medium is an apparatus from which the computer application is accessible by computer 204, and the computer application is processable by computer 204 for causing computer 204 to perform such additional operations. In addition to reading such functional descriptive material from computer-readable medium 212, computer 204 is capable of reading such functional descriptive material from (or through) network 112 which is also a computer-readable medium (or apparatus). Moreover, the memory device of computer 204 is itself a computer-readable medium (or apparatus).

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing system, comprising:
    a computer-readable medium for storing information; and
    a computing device for:
        receiving an installation file that is associated with a software application, wherein the installation file specifies a plurality of installable features that are associated with the software application, and wherein the installation file specifies a plurality of installable files that are associated with the installable features;
        identifying first and second subsets of the installable features, wherein the first subset of the installable features is to be installed onto the computer-readable medium, wherein the second subset of the installable features is to be omitted from installation onto the computer-readable medium, wherein the first subset of the installable features includes a first installable feature, and wherein the second subset of the installable features includes a second installable feature;
        in response to the installation file and at least one of the first and second subsets of the installable features, identifying first and second subsets of the installable files, wherein the first subset of the installable files is to be installed onto the computer-readable medium, wherein the second subset of the installable files is to be omitted from installation onto the computer-readable medium, and wherein a particular installable file is omitted from the second subset of the installable files in response to the particular installable file being associated with both of the first and second installable features; and
        outputting the installation file and the first subset of the installable files for storage by the computer-readable medium.

2. The computing system of claim 1 wherein the computer readable medium is a hard disk.

3. The computing system of claim 1 wherein the computing device is a server computing device.

4. The computing system of claim 1 wherein the computer readable medium is a first computer-readable medium, and wherein the computing device receives the installation file and the installable files from a second computer-readable medium.

5. The computing system of claim 4 wherein the second computer-readable medium is a hard disk.

6. The computing system of claim 4 wherein the second computer-readable readable medium is a CD-ROM.

7. The computing system of claim 4 wherein the second computer readable medium is a network.

8. The computing system of claim 1 wherein the computing device is for:
    outputting the first subset of the installable files for installation onto the computer-readable medium in response to the installation file.

9. A computing system, comprising:
    a first computer-readable medium for storing information including an installation file that is associated with a software application, wherein the installation file specifies a plurality of installable features that are associated with the software application, and wherein the installation file specifies a plurality of installable files that are associated with the installable features; and
    a first computing device for:
        identifying first and second subsets of the installable features, wherein the first subset of the installable features is to be installed onto a second computer-readable medium, wherein the second subset of the installable features is to be omitted from installation onto the second computer-readable medium wherein the first subset of the installable features includes a first installable feature, and wherein the second subset of the installable features includes a second installable feature;
        in response to the installation file and at least one of the first and second subsets of the installable features, identifying first and second subsets of the installable files, wherein the first subset of the installable files is to be installed onto the second computer-readable medium, wherein the second subset of the installable files is to be omitted from installation onto the second computer-readable medium, and wherein a particular installable file is omitted from the second subset of the installable files in response to the particular installable file being associated with both of the first and second installable features; and
        outputting the installation file and the first subset of the installable files to a second computing device for storage onto the second computer-readable medium.

10. The computing system of claim 9 wherein the second computer readable medium is a hard disk.

11. The computing system of claim 9 wherein the first computing device is a server computing device.

12. The computing system of claim 9 wherein the first computer-readable medium is a hard disk.

13. The computing system of claim 9 wherein the first computer-readable medium is a CD-ROM.

14. The computing system of claim 9 wherein the first computing device is for:
    outputting the first subset of the installable files to the second computing device for installation onto the second computer-readable medium in response to the installation file.

15. A method performed by a computing system, the method comprising:

receiving an installation file that is associated with a software application, wherein the installation file specifies a plurality of installable features that are associated with the software application, and wherein the installation file specifies a plurality of installable files that are associated with the installable features;

identifying first and second subsets of the installable features, wherein the first subset of the installable features is to be installed onto a computer-readable medium, wherein the second subset of the installable features is to be omitted from installation onto the computer-readable medium, wherein the first subset of the installable features includes a first installable feature, and wherein the second subset of the installable features includes a second installable feature;

in response to the installation file and at least one of the first and second subsets of the installable features, identifying first and second subsets of the installable files, wherein the first subset of the installable files is to be installed onto the computer-readable medium, wherein the second subset of the installable files is to be omitted from installation onto the computer-readable medium, and wherein a particular installable file is omitted from the second subset of the installable files in response to the particular installable file being associated with both of the first and second installable features; and outputting the installation file and the first subset of the installable files for storage by the computer-readable medium.

16. The method of claim 15 wherein the outputting comprises outputting the installation file and the identified subset of the installable files for storage by a first computer-readable medium and wherein the receiving comprises receiving the installation file and the installable files from a second computer-readable medium.

17. The method of claim 16 wherein the receiving comprises receiving the installation file and the installable files from a hard disk.

18. The method of claim 16 wherein the receiving comprises receiving the installation file and the installable files from a CD-ROM.

19. The method of claim 16 wherein the receiving comprises receiving the installation file and the installable files from a network.

20. The method of claim 15 wherein the outputting comprises outputting the first subset of the installable files for installation onto the computer-readable medium in response to the installation file.

21. A method performed by a first computing system, the method comprising:

on a first computer-readable medium, storing information including an installation file that is associated with a software application, wherein the installation file specifies a plurality of installable features that are associated with the software application, and wherein the installation file specifies a plurality of installable files that are associated with the installable features;

identifying first and second subsets of the installable features, wherein the first subset of the installable features is to be installed onto a second computer-readable medium, wherein the second subset of the installable features is to be omitted from installation onto the second computer-readable medium wherein the first subset of the installable features includes a first installable feature, and wherein the second subset of the installable features includes a second installable feature;

in response to the installation file and at least one of the first and second subsets of the installable features, identifying first and second subsets of the installable files, wherein the first subset of the installable files is to be installed onto the second computer-readable medium, wherein the second subset of the installable files is to be omitted from installation onto the second computer-readable medium, and wherein a particular installable file is omitted from the second subset of the installable files in response to the particular installable file being associated with both of the first and second installable features; and outputting the installation file and the first subset of the installable files to a second computing system for storage onto the second computer-readable medium.

22. The method of claim 21 wherein the storing comprises storing the information on a hard disk.

23. The method of claim 21 wherein the storing comprises storing the information on a CD-ROM.

24. The method of claim 21 wherein the outputting comprises outputting the first subset of the installable files to the second computing system for installation onto the second computer-readable medium in response to the installation file.

25. The computing system of claim 8 wherein the first subset of the installable files is associated with the software application for installation on the computer-readable medium.

26. The computing system of claim 14 wherein the first subset of the installable files is associated with the software application for installation onto the second computer-readable medium.

27. The method of claim 20 wherein the outputting comprises outputting the installation file and the first subset of the installable files for storage by the computer-readable medium the first subset of the installable files being associated with the software application for installation on the computer-readable medium.

28. The method of claim 24 wherein the outputting comprises outputting the installation file and the first subset of the installable files to the second computing system, the first subset of the installable files being associated with the software application for installation onto the second computer-readable medium.

* * * * *